UNITED STATES PATENT OFFICE.

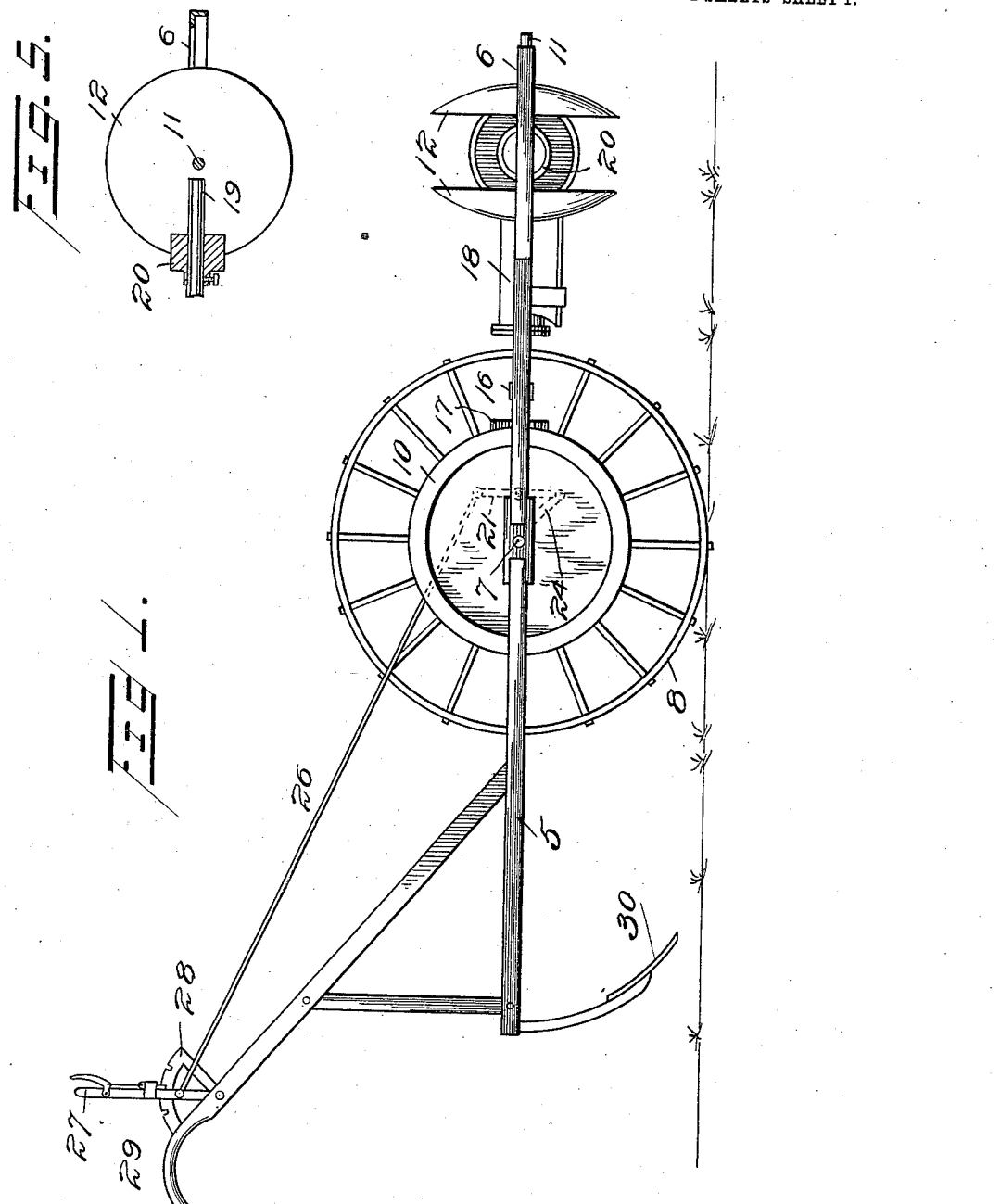

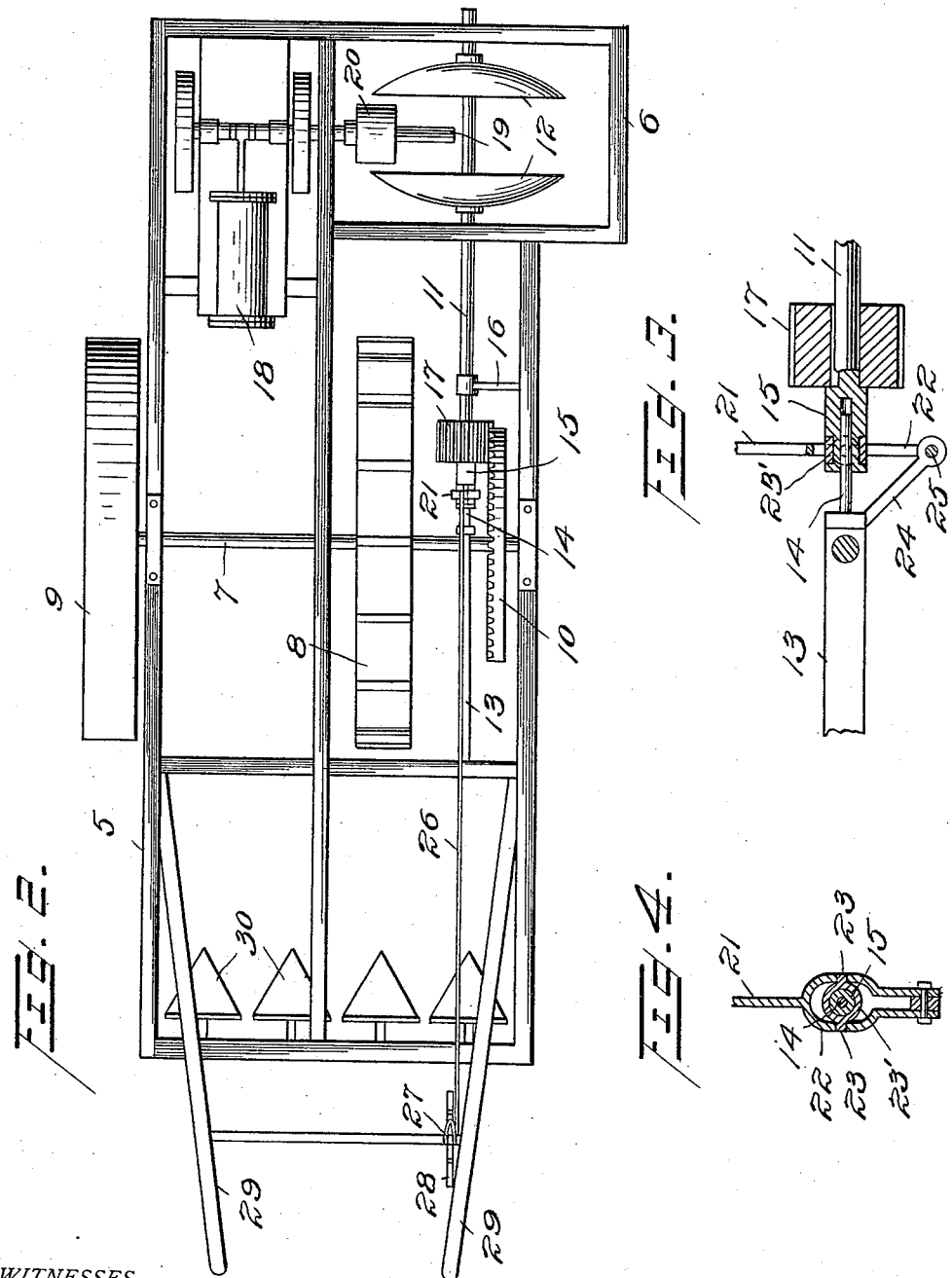

THOMAS ALEXANDER MAXWELL, OF WHIGHAM, GEORGIA.

GEARING.

1,054,703. Specification of Letters Patent. Patented Mar. 4, 1913.

Application filed March 14, 1912. Serial No. 683,777.

*To all whom it may concern:*

Be it known that I, THOMAS ALEXANDER MAXWELL, a citizen of the United States, residing at Whigham, in the county of Grady and State of Georgia, have invented certain new and useful Improvements in Gearing, of which the following is a specification, reference being had to the accompanying drawings.

This invention relates to motor plows of that type wherein friction power transmission means is employed for transmitting power from the motor to the drive wheel shaft, and the invention has for its primary object to provide simple means whereby the transmitting shaft may be easily and quickly adjusted to engage one or a pair of friction disks carried thereby with a disk on the motor shaft to reverse the rotation of the drive wheel when desired.

Another object of the invention is to provide a motor plow wherein a single drive or ground wheel is provided, guiding handles fixed to the frame of the plow, a power transmission shaft geared to the drive wheel shaft, and means on the frame to support one end of the transmission shaft and permit of its longitudinal sliding movement to shift either of the disks carried thereby into engagement with the disk on the motor shaft whereby the direction of movement of the machine may be quickly changed without interrupting the rotation of the transmission shaft or stopping the operation of the motor.

A still further object of the invention is to provide a motor plow of the above character which is simple and durable in construction, may be readily controlled by the operator without requiring him to change his position at the rear of the machine, and can also be manufactured at comparatively small cost.

With the above and other objects in view, the invention consists of the novel features of construction, combination and arrangement of parts hereinafter fully described and claimed, and illustrated in the accompanying drawings, in which—

Figure 1 is a side elevation of a motor plow embodying the present invention; Fig. 2 is a top view thereof; Fig. 3 is a section taken on the line 3—3 of Fig. 2; Fig. 4 is a detail section taken on the line 4—4 of Fig. 2; and Fig. 5 is a section taken on the line 5—5 of Fig. 2.

Referring in detail to the drawings 5 designates a frame which is of substantially rectangular form in plan and is preferably constructed from angle iron. The front end of this frame is provided with a lateral extension 6. The drive wheel shaft 7 is mounted in suitable bearings provided in the longitudinal frame bars at a point substantially intermediate the ends of the frame. Upon this shaft the ground wheel 8 is fixed, said wheel being disposed centrally between the outer longitudinal frame bars and provided upon its periphery with the usual ground engaging cleats. A balance wheel 9 is fixed to one end of the drive shaft exteriorly of the frame 5. To the other end of this shaft within the frame of the machine, a crown gear 10 is secured. A longitudinally disposed power transmission shaft 11 is mounted in bearings provided upon the transverse frame bars and upon one end thereof the spaced friction disks 13 are fixed, said disks being disposed in the extended forward end portions 6 of the frame. A short longitudinal bar 13 is fixed at one end to one of the transverse frame bars and the other end of this bar 13 is provided with a reduced cylindrical extension 14. The inner end of the power transmittion shaft 11 is provided with an enlarged tubular portion 15 which is loosely engaged upon the cylindrical extension 14 of the bar 13 and is adapted for longitudinal sliding movement thereon. A bearing arm 16 fixed to the frame 5 supports the transmission shaft 11 at an intermediate point. A pinion 17 is keyed or otherwise rigidly secured upon the transmission shaft and engages the teeth of the crown gear 10.

In the forward end of the machine frame a motor 18 of any approved form and construction is mounted. The shaft 19 of this motor extends between the faces of the opposed friction disks 12 and has fixed thereon a drive disk 20 which is longitudinally movable upon the shaft 19 and is adapted to be positioned thereon with relation to the rotative axis of the transmission disks to drive the transmission shaft at a predetermined speed. It will be readily seen that when one of the disks 12 is engaged with the drive disk 20 on the motor shaft, the shaft 11 is rotated in one direction and upon engagement with the other friction disk 12 of the drive disk the rotation of the transmission shaft is reversed. This reversal of rotation of the shaft is obtained by shifting said shaft longitudinally to engage the respective disks carried thereby with the disk on the motor shaft.

For the above purpose I provide the lever 21 which has spaced arms 22 formed thereon extending upon opposite sides of the tubular enlarged end 15 of the transmission shaft and above and below the same. These arms are fulcrumed at a point intermediate of their ends upon the studs 23 which project from the collar 23' at diametrically opposite points, loosely arranged upon the enlargement 15 of the transmission shaft. A downwardly and forwardly inclined arm 24 is formed upon the end of the rigid supporting bar 13 and to the lower end of this arm the lower ends of the parallel portions 22 of the lever 21 are pivoted as indicated at 25. The upper end of the lever 21 is connected by means of a rod 26 to an actuating lever 27 which is mounted upon a rack segment 28 secured to a cross bar connecting the handles 29. The lever 27 carries the usual spring controlled locking dog for engagement with the teeth of the rack 28. It will be readily seen that by the manipulation of the lever 27 the lever 21 is thrown forwardly or rearwardly to shift the transmission shaft 11 and thereby engage either of the disks carried thereby with the friction drive disk 20. It is understood of course, that the pinion 17 on the transmission shaft remains in engagement with the teeth of the crown gear 10 during this shifting movement of said shaft. The tubular end portion 15 of the transmission shaft is of sufficient length to provide a proper support for said shaft at all times.

One or more plow shovels 30 may be secured to the rear portion of the frame 5 in any approved manner. From the above description it will be seen that I have devised a motor plow which is of comparatively simple construction and wherein the movement of the plow may be controlled from the operating handles 29 of the machine without requiring that the operator change his position. The reverse movement of the machine may be easily and quickly effected by simply manipulating the lever 27 to shift the transmission shaft and engage the proper disk carried thereby with the drive disk on the motor shaft. Owing to the comparatively few elements employed in the construction of the machine, it will further be obvious that the same is extremely strong and durable and can be produced at small cost.

While I have shown and described the preferred construction and arrangement of the various parts, it will be understood that the invention is susceptible of considerable modification in the form, proportion and arrangement thereof without departing from the essential feature or sacrificing any of the advantages of the invention.

Having thus described the invention what is claimed is:—

1. In vehicle drive gearing, a motor shaft, a driven shaft, a transmission shaft geared to the driven shaft, spaced friction disks on the transmission shaft, a friction disk on the motor shaft, one end of the transmission shaft being longitudinally bored, a rigid supporting element for said shaft loosely disposed in the bore thereof, and manually operable means connected to the transmission shaft to shift the same longitudinally and engage either of the disks carried thereby with the disk upon the motor shaft.

2. In vehicle drive gearing, a motor shaft, a driven shaft, a transmission shaft geared to the driven shaft, spaced friction disks on the transmission shaft, a friction disk on the motor shaft, said transmission shaft having an enlarged tubular end, a rigid supporting member loosely disposed in the tubular end of said shaft, said shaft being longitudinally movable thereon, a lever pivotally mounted intermediate of its ends upon the tubular end of said shaft, said lever being fulcrumed at one end for oscillatory movement, and operating means connected to said lever to operate the same and shift the transmission shaft longitudinally to engage either of the disks carried thereby with the disk upon the motor shaft.

In testimony whereof I hereunto affix my signature in the presence of two witnesses.

THOMAS ALEXANDER MAXWELL.

Witnesses:
  E. B. STAPLETON,
  R. R. TERRELL.

---

Copies of this patent may be obtained for five cents each, by addressing the "Commissioner of Patents, Washington, D. C."